United States Patent
Andersson et al.

(10) Patent No.: US 8,451,902 B2
(45) Date of Patent: May 28, 2013

(54) TEMPLATE-BASED PIXEL BLOCK PROCESSING

(75) Inventors: Kenneth Andersson, Gävle (SE); Clinton Priddle, Väsby (SE); Yuan Chun Wu, Hsingchu (TW)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 428 days.

(21) Appl. No.: 12/935,757

(22) PCT Filed: Oct. 21, 2008

(86) PCT No.: PCT/SE2008/051181
§ 371 (c)(1),
(2), (4) Date: Sep. 30, 2010

(87) PCT Pub. No.: WO2009/131508
PCT Pub. Date: Oct. 29, 2009

(65) Prior Publication Data
US 2011/0026599 A1      Feb. 3, 2011

Related U.S. Application Data

(60) Provisional application No. 61/047,250, filed on Apr. 23, 2008.

(51) Int. Cl.
*H04N 11/02* (2006.01)
(52) U.S. Cl.
USPC .................. 375/240.16; 375/240.12; 382/236
(58) Field of Classification Search
USPC ............. 375/240.02, 240.12, 240.16, 240.17, 375/240.27, E7.104, E7.123, E7.125, E7.243; 382/232, 236, 268
See application file for complete search history.

(56) References Cited

U.S. PATENT DOCUMENTS

| | | | | |
|---|---|---|---|---|
| 5,852,682 | A * | 12/1998 | Kim | 382/268 |
| 5,862,261 | A * | 1/1999 | Lee | 382/236 |
| 6,233,277 | B1 * | 5/2001 | Ozcelik et al. | 375/240.02 |
| 6,289,052 | B1 * | 9/2001 | Faryar et al. | 375/240.16 |

(Continued)

FOREIGN PATENT DOCUMENTS

| WO | WO 2006/033953 A1 | 3/2006 |
|---|---|---|
| WO | WO 2008/130367 A1 | 10/2008 |

OTHER PUBLICATIONS

International Search Report, PCT/SE2008/051181, Jan. 19, 2010.

(Continued)

*Primary Examiner* — Christopher S Kelley
*Assistant Examiner* — Kaitlin A Hughes
(74) *Attorney, Agent, or Firm* — Myers Bigel Sibley & Sajovec, P.A.

(57) ABSTRACT

An adaptive filter to use in connection with prediction-based pixel block encoding and decoding is determined independently at the encoder and decoder side through a template-based procedure. A pixel block (12) has an identified reference pixel block (22) in a reference frame (20). A template (16) of multiple pixels (18) adjacent the pixel block (12) and a reference template (26) of multiple pixels (28) adjacent the reference pixel block (22) are used for determining the filter parameters of the adaptive filter. The determined adaptive filter is then applied to the reference pixel block (22) and is used for generating an encoded representation (40) of the pixel block (12) during encoding and or generating a decoded representation of the pixel block (12) during decoding.

16 Claims, 8 Drawing Sheets

U.S. PATENT DOCUMENTS

2007/0064804 A1    3/2007   Paniconi et al.
2007/0171987 A1*   7/2007   Trimeche ............... 375/240.27
2008/0175322 A1*   7/2008   Lee et al. ............... 375/240.16

OTHER PUBLICATIONS

International Preliminary Report on Patentability, PCT/SE2008/051181, Jun. 30, 2010.

Friebe et al., "3D-Deblocking for Error Concealment in Block-Based Video Decoding Systems", Picture Coding Symposium, Beijing, Apr. 24, 2006, 5 pp.

Har-Noy et al., "Adaptive In-Loop Prediction Refinement for Video Coding", IEEE $9_{th}$ Workshop on Multimedia Signal Processing, Oct. 1, 2007, pp. 171-174.

International Telecommunication Union, "Advanced video coding for generic audiovisual services", *Series H: Audiovisual and Multimedia Systems—infrastructure of audiovisual services—Coding of moving video*, ITU-T Rec. H.264, May 2003, 282 pp.

International Telecommunication Union, Matsushita (Wittmann et al.), "Separable adaptive interpolation filter", ITU—Telecommunications Standardization Sector, Study Group 16, Contribution 219, Jun. 2007, 9 pp.

International Telecommunication Union, Qualcomm Inc. (Ye et al.), "Enhanced Adaptive Interpolation Filter", ITU—Telecommunications Standardization Sector, Study Period 2005-2008, Study Group 16, Question 6, Document Com 16-C-464-E, Apr. 2008, 4 pp.

International Telecommunication Union (Rusanovskyy et al.), "Adaptive interpolation with Directional Filters", ITU—Telecommunications Standardization Sector, Study Group 16, Question 6, Document VCEG-AG21, Oct. 2007, 12 pp.

Vatis et al., "Two-dimensional non-separable Adaptive Wiener Interpolation Filter for H.264/AVC", International Organisation for Standardisation ISO/IEC JTC 1/SC 29/WG 11/M11845 Coding of Moving Pictures and Audio, Apr. 29, 2005, 6 pp.

International Telecommunication Union (Vatis et al.), "Two-dimensional non-separable adaptive Wiener interpolation filter for H-264/AVC", ITU—Telecommunications Standardization Sector, Study Group 16, Question 6, Document VCEG-ZI 7, Apr. 16, 2005, 5 pp.

Yin et al., "Localized Weighted Prediction for Video Coding", IEEE 2005 International Symposium on Circuits and Systems (ISCAS 2005), vol. 5, May 23, 2005, pp. 4365-4368.

Communication pursuant to Article 94(3) EPC, EP Application No. 08 873 990, Nov. 22, 2011; 5 pages.

* cited by examiner

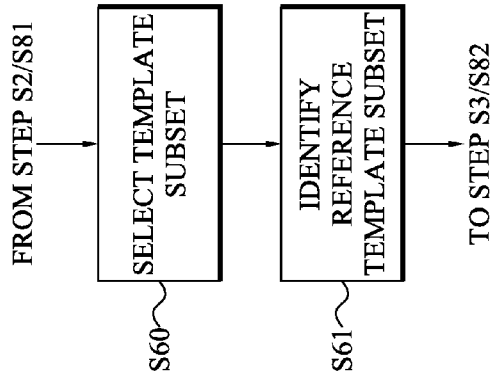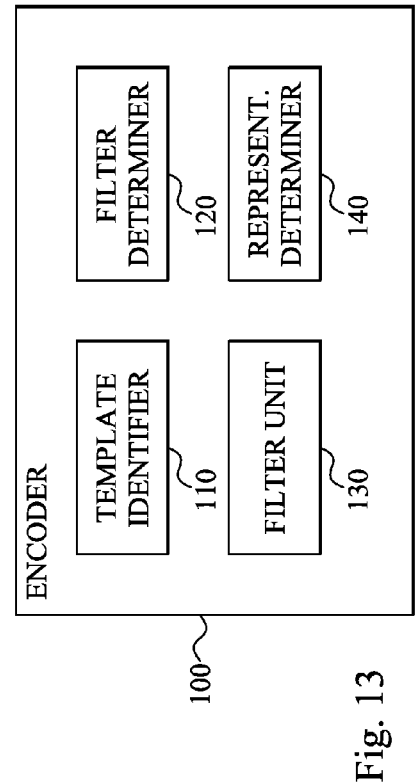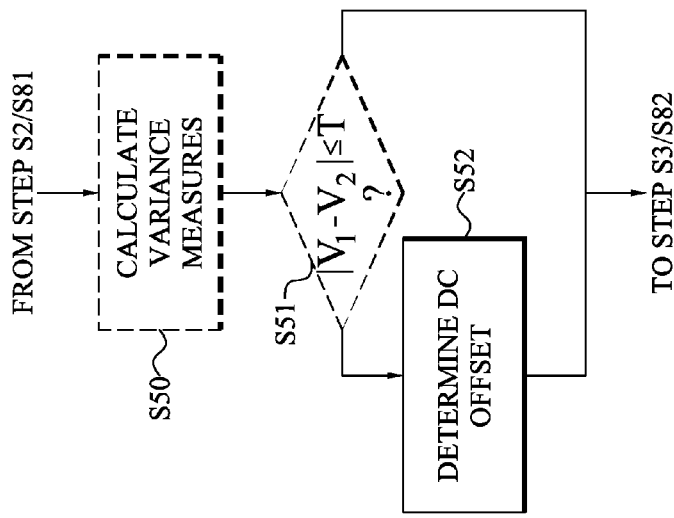

TEMPLATE-BASED PIXEL BLOCK PROCESSING

CROSS REFERENCE TO RELATED APPLICATIONS

This application is a 35 U.S.C. §371 national stage application of PCT International Application No. PCT/SE2008/051181, filed on 21 Oct. 2008, which itself claims priority to U.S. provisional patent Application No. 61/047,250, filed 23 Apr. 2008, the disclosure and content of both of which are incorporated by reference herein in their entirety. The above-referenced PCT International Application was published in the English language as International Publication No. WO 2009/131508 A2 on 29 Oct. 2009.

TECHNICAL FIELD

The present invention generally relates to pixel block encoding and decoding applicable to image and video sequences, and in particular to template-based pixel block encoding and decoding.

BACKGROUND

Temporal and spatial redundancy can be exploited using predictions to make a compact representation of the video signal possible. Pixel prediction is an important part of video coding standards such as H.261, H.263, MPEG-4 and H.264 [1]. In H.264 there are three pixel prediction methods utilized namely intra, inter and bi-prediction. Intra prediction provides a spatial prediction of the current pixels block from previously decoded pixels of the current frame. Inter prediction gives a temporal prediction of the current pixel block using a corresponding but displaced pixel block in a previously decoded frame. Bi-directional prediction gives a weighted average of two inter predictions.

The inter prediction method of H.264 can achieve fractional-pel resolution in the motion estimation. A fixed half-pel filter with filter taps [1 −5 20 20 −5 1]/32 is first applicable to obtain initial half-pel resolution. A bilinear filter can then be applied on a full-pel sample and a half-pel sample to achieve quarter-pel resolution. These fractional-pel interpolation filters used in H.264 are fixed, implying the same filter taps are used regardless of which particular block that is encoded.

Many techniques have been suggested to improve the inter prediction over the years, for instance by employing adaptive interpolation filters. Such an approach has been suggested by first determining displacement vectors using the fixed H.264 interpolation filter for each pixel block to be coded. With the obtained displacement vectors, a calculation of adaptive filter coefficients of a two-dimensional non-separable adaptive Wiener interpolation filter [2], a separable adaptive interpolation filter [3], a directional adaptive interpolation filter [4] or an adaptive interpolation filter [5] is then done afterwards.

In H.264 inter-prediction, motion compensation accounts for a significant percentage of the compression efficiency. The motion information is derived at the encoder side and coded into the bit stream, where the motion information requires a major part of the bit stream. In this approach, the decoder can simply perform motion compensated prediction based on the decoded motion vector information. Usage of adaptive filters, though often improving the prediction accuracy, even further increases the overhead of the bit stream as the determined parameters of the adaptive filters need to be sent from the encoder to the decoder.

SUMMARY

There is a need for a technique that benefits from the improved accuracy in predictions achieved by adaptive filters as compared to fixed interpolation filters but does not significantly increase the amount of data that has to be sent from the encoder side to the decoder side.

It is a general objective to provide a template-based determination of adaptive filters at an encoder and at a decoder.

This and other objectives are met by the embodiments as defined by the accompanying patent claims.

Briefly, the present embodiments involve encoding and decoding of a pixel block in a frame of an image or a video sequence. The embodiments disclose the determination of at least one adaptive filter substantially independently at the encoder and decoder side, relaxing the need of signaling filter parameters from the encoder to the decoder.

In the encoding and decoding a template comprising multiple pixels and being positioned adjacent a pixel block to encode or decode is identified in the frame. A reference pixel block present in a reference frame of the image or video sequence is identified in a motion estimation procedure during encoding and based on a displacement vector during decoding, where this displacement vector has been determined by the encoder in the motion estimation procedure and is signaled to the decoder. A corresponding reference template comprising multiple pixels and being positioned adjacent to the reference pixel block in the reference frame is also identified.

Property values of pixels in the template and in the reference template are used for determining at least one adjustable filter parameter of at least one adaptive filter during the encoding and decoding. This determined at least one adaptive filter is applied subsequently to the reference pixel block to get filtered property values.

During encoding, an encoded representation of the pixel block is determined based on the property values of the pixel block and the filtered property values, where this encoded representation typically comprises coded, possibly transformed and quantized, residual values determined based on the property values of the pixel block and the filtered property values.

Decoding of the pixel block determines a decoded representation of the pixel block based on the filtered property values and residual values, following decoding, possibly inverse transforming and dequantization, of encoded residual data provided from the encoder.

In an optional implementation, the encoder and decoding also determines a prediction template by filtering the reference template using at least one, typically fixed, interpolation filter. Determination of the adaptive filter preferably involves minimizing the squared difference between the property values of the template, the filtered property values obtained by filtering the reference template with the adaptive filter and the property values of the prediction template. In such a case, the encoder and decoder preferably also calculate a prediction pixel block by filtering the reference pixel block using the same at least one interpolation filter. In the encoding, the encoded representation of the pixel block is determined based on the property values of the pixel block, the filtered property values obtained by filtering the reference pixel block with the adaptive filter and the property values of the prediction pixel block. During decoding, the decoded representation of the pixel block is determined based on the residual values, the filtered property values obtained by filtering the reference pixel block with the adaptive filter and the property values of the prediction pixel block.

The embodiment improves the accuracy in the prediction-based coding and decoding through the usage of adaptive filters but do not require transmission of large amount of data defining the filter parameters of the adaptive filter from the encoder side to the decoder side.

Other advantages offered will be appreciated upon reading of the below description of the embodiments.

BRIEF DESCRIPTION OF THE DRAWINGS

The embodiments together with further objects and advantages thereof, may best be understood by making reference to the following description taken together with the accompanying drawings, in which:

FIG. 9 is a flow diagram illustration additional, optional steps of the encoding method of FIG. 1 or the decoding method of 12;

FIG. 10 is a flow diagram illustrating additional, optional steps of the encoding method of FIG. 1 or the decoding method of 12;

FIG. 13 is a schematic block diagram of an encoder according to an embodiment;

DETAILED DESCRIPTION

Figure 1:
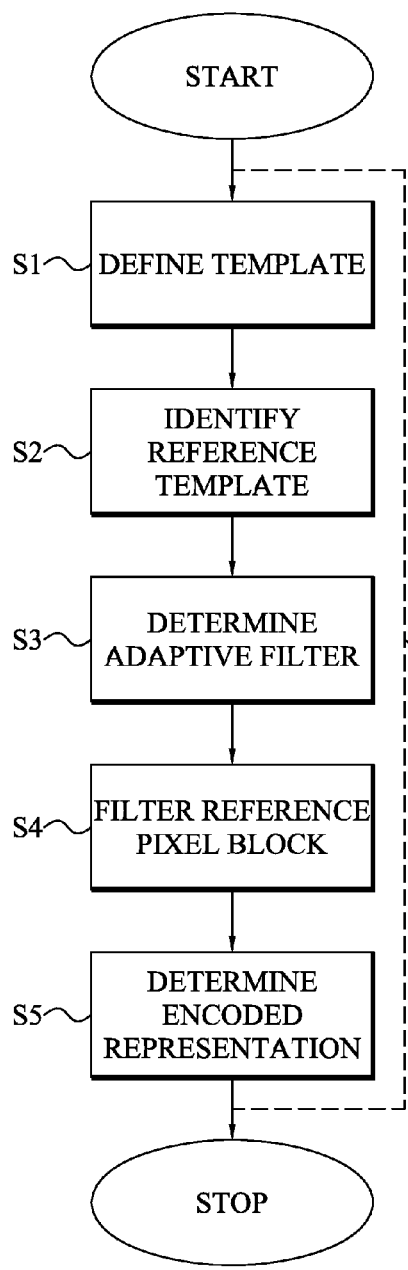
FIG. 1 is a flow diagram illustrating a method of encoding a pixel block according to an embodiment.

Throughout the drawings, the same reference characters will be used for corresponding or similar elements.

The present embodiments are directed towards generation and usage of adaptive filters in connection with prediction-based encoding and decoding of pixel blocks in a frame of an image or a video sequence. In clear contrast to the prior art arrangements disclosing the determination of adaptive filters, such as adaptive interpolation filters, at the encoder side and then signaling the determined filter parameters of the adaptive filters to the decoder side, the embodiments have taken a radically different approach. The embodiments, therefore, define and use templates at both the encoder and decoder as basis for the determination of the adaptive filters, which are to be applied to reference pixel blocks during the prediction-based encoding and decoding, respectively. No signaling or at least a significant reduction in the data relating to the adaptive filters that has to be transmitted from the encoder to the decoder is thereby achieved.

The embodiments therefore benefit from the advantages of adaptive filters over fixed standard filters in terms of improved prediction accuracy but do not suffer from the large increase in signaled data that such prior art adaptive filters impose to the encoded bit stream.

Pixel Block Encoding

FIG. 1 is a flow diagram illustrating a method of encoding a pixel block in a frame of an image or a video sequence according to an embodiment. As is well known in the art, an image comprises one or multiple, i.e. at least two, frames, while a video sequence comprises multiple such frames or pictures. A frame can in turn be regarded as composed of a series of one or more slices, where such a slice consists of one or more macroblocks of pixels or image element. Such a pixel has associated property value, such as color, in the red, green, blue, RGB, space, or luminance (Y) and chrominance (Cr, Cb or sometimes denoted U, V).

The pixels are organized into groups or blocks of pixels. The expression "pixel block" denotes any of the prior art known partitions of frames and slices into collections of pixels that are handled together during encoding and decoding. Generally, such a pixel block is a rectangular, M×N, or square, M×M, block of pixels. An example of such a grouping is a macroblock in the video compression standard. Such a macroblock generally has a size of 16×16 pixels. A macroblock can consists of multiple so-called sub-macroblock partitions, such as 16×8, 8×16, 8×8, 8×4, 4×8 and 4×4 pixels. The 8×8 sub-macroblock partition is often denoted as a sub-macroblock or sub-block, whereas a 4×4 partition is often denoted block.

Figure 2:
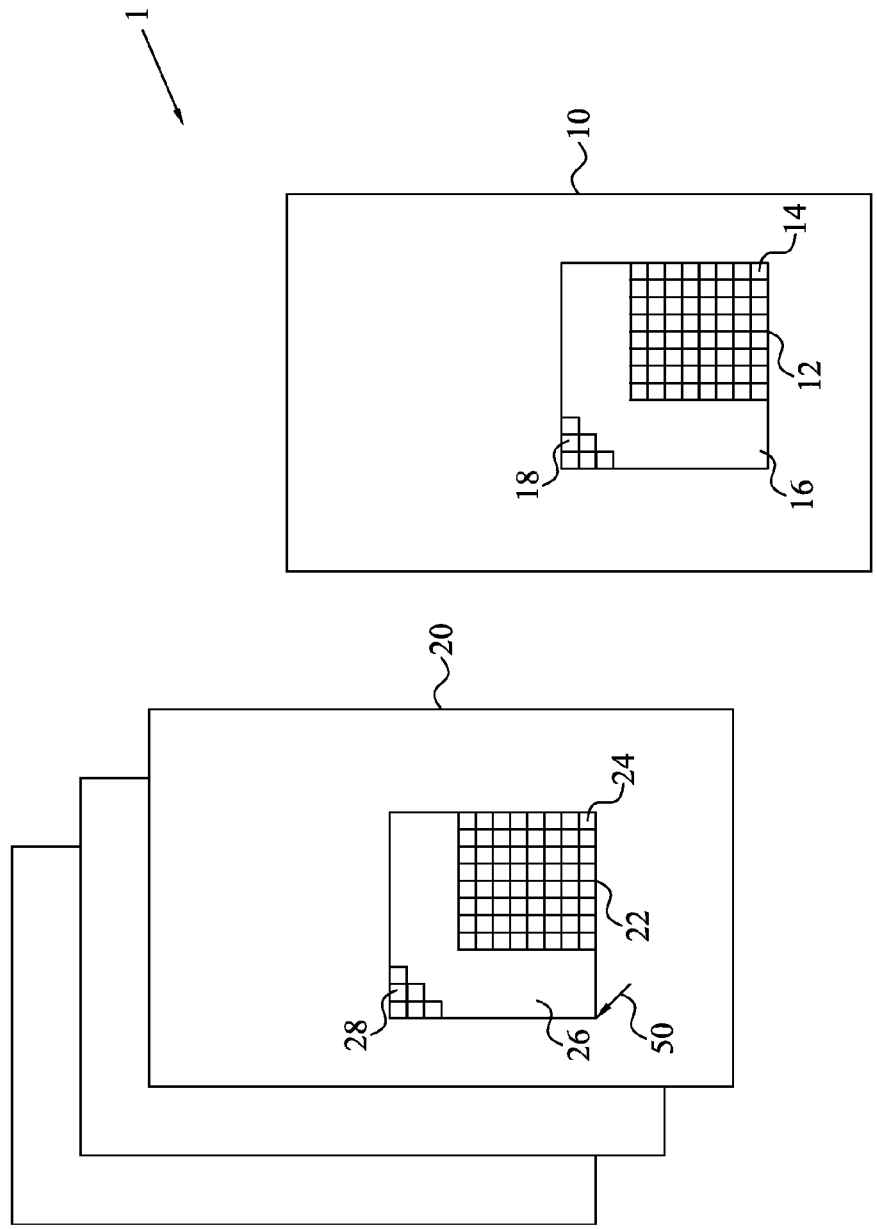
FIG. 2 is a schematic illustration of a video sequence of frames comprising pixel blocks.

The method generally starts in step S1 where a template comprising multiple pixels is defined for the pixel block to be encoded. The template is furthermore positioned adjacent to the pixel block in the frame. FIG. 2 schematically illustrates this concept. The figure illustrates a video sequence 1 of multiple frames 10, 20. The figure also shows the current pixel block 12 comprising, in this illustrative example, 8×8 pixels. The template 16 comprises multiple pixels 18, of which only a few are illustrated in order to simplify the drawing. In this example, the template 16 comprises neighboring and adjacent pixels 18 positioned prior the pixels 14 of the pixel block 12 in the encoding/decoding order, i.e. going from the left to the right and from up to down. If another encoding/decoding order is employed, the position of the template 16 relative the pixel block 12 is preferably updated so that the template pixels 18 will be present in pixel blocks that have already been encoded or decoded once the current pixel block 12 is to be encoded or decoded.

In case the pixel block 12 comprises M×N pixels 14 and the template extends R pixels 18 above the pixel block 12 and S pixels 18 to the left of the pixel block 12 as in FIG. 2, the template 16 will in total comprise R×S+R×N+S×M pixels 18. Alternative implementations, though often less preferred, could define the template 16 in step S1 to merely include pixels 18 positioned above the pixel block 12, i.e. R×N pixels, include pixels 18 positioned above and diagonally to the upper left of the pixel block, i.e. R×S+R×N pixels 18, include pixels 18 positioned to the left of the pixel block 12, i.e. S×M pixels 18, or include pixels 18 positioned to the left and diagonally to the upper left of the pixel block, i.e. R×S+S×M pixels 18.

The position and size of a template 16 relative a pixel block 12 is preferably fixed and pre-defined for both the encoder and decoder. Alternatively, multiple alternative template sizes could be used and the particular template size that is to be applied for a given pixel block 12 is then determined by the encoder. However, in such an implementation the encoder notifies the decoder of the selected template size, for instance using an identifier of the selected template size. Alternatively, the decoder has to perform the same optimization procedure that the encoder conducted in order to determine the template size for the given pixel block.

A next step S2 of the encoding method identifies a reference template 26 comprising multiple pixels 28. This reference template 26 is being positioned adjacent to a reference pixel block 22 in a reference frame 20 of the image or video sequence 1. In a typical implementation, the size of the reference pixel block 22 in terms of the number of including pixels 24 is preferably the same as for the current pixel block 12. Furthermore, the size and position of the reference template 26 relative the reference pixel block 22 in the reference frame 20 are preferably the same as the size and position of the template 16 relative the pixel block 12 to be encoded in the current frame 10.

The reference template 26 is preferably identified in step S2 by first performing a motion estimation regarding the pixel block 12 in order to identify a suitable reference pixel block 22 in a reference frame 20. The reference frame 20 can be predefined, such as being the previous frame 20 in the video sequence 1. Alternatively, multiple, typically previous, candidate frames may be available in the motion estimation. Motion estimation is well known in the art and is described, for instance, in document [1]. Briefly, motion estimation is the process of determining a motion vector 50 that describe the transformation of the pixel block 12 to the reference pixel block 22. There are different algorithms that can be used in the motion estimation, such as block-matching algorithms, phase correlation algorithms, Maximum a posteriori (MAP) or Markov random field (MRF) type of Bayesian estimators, pixel recursive algorithms, etc., all known to the person skilled in the art. These different algorithms have the common feature of identifying the reference pixel block 22 as the pixel block among multiple candidate reference block that minimizes a difference metric between the pixel property values, such as color, of the pixel block 12 and the reference pixel block 22, such as minimizes the mean squared error (MSE), sum of absolute differences (SAD), sum of squared differences (SSD), etc.

Once the most appropriate, in terms of minimizing the difference metric, reference pixel block 22 has been found, the reference template 26 can simply be identified as the L-shaped region attached around the top and left edges of the reference pixel block 22.

The pixels or more correctly the property values of pixels in the template and in the reference template are then employed in step S3 for determining at least one adaptive filter. This filter determination preferably uses all pixels in the template and the reference template to thereby provide us much statistics as possible. However, in some applications, as is further discussed herein, it may be more advantageously to merely utilize a portion of the multiple pixels in the template and in the reference template.

The determination in step S3 involves determining the or those filter parameters of the filter that are adaptable, such as one or more filter taps, filter offsets and/or a multiplicative or additive scaling factor of the adaptive filter.

In a typical implementation, step S3 determines one adaptive filter for the pixel block but could in alternative implementations determine two or even more different adaptive filters.

The template and reference templates are used, in the filter determination of step S3, as statistics basis and substitute for the whole frame and reference frame in the determination process. Note that during decoding, only those pixels present in pixel blocks that have already been decoded in the current frame are available to the decoder. As the adaptive filter is to be determined at both the encoder and decoder side without the need for any explicit signaling of determined filter parameters, the determination of the adaptive filter at the encoder can only use those pixels that will be available to the decoder during the decoding of the current pixel block. Therefore only a portion of the current frame, i.e. the template, and a portion of the reference frame, i.e. the reference template, are used in the determination of the adaptive filter in step S3.

Once the at least one adaptive filter has been determined, the encoding method continues to step S4. This step S4 determines filtered property values based on the property values of the reference pixel block and the determined at least one adaptive filter. In a typical implementation, the pixels of the reference pixel block are filtered with the adaptive filter to get the filtered property values.

An encoded representation of the pixel block is determined in the following step S5 based on the property values of the pixel block and the filtered property values determined in step S4. In a particular implementation, step S5 determines, for each pixel in the pixel block, a residual value based on the property value of the pixel and the corresponding filtered property value of the same pixel position in the reference pixel block as the pixel occupies in the pixel block to be encoded. The residual values are then typically quantized, transformed and encoded, such as entropy encoded using, for instance, context-adaptive binary arithmetic coding (CABAC), context-adaptive variable length coding (CAVLC), Golomb-Rice, Huffman or Tunnstall. The quantized, transformed and entropy encoded residual values constitute together with an encoded representation of the motion or displacement vector the encoded representation of the pixel block. Thus, no information defining the filter coefficients and any other filter parameters of the adaptive filter determined in step S3 need to be included in the encoded representation. The size or bit length of the encoded representation will therefore be significantly reduced as compared to the prior art cases having an explicit signaling of the parameters of determined adaptive filters.

The encoding method ends or continues by encoding a next pixel block in the frame according to the encoding order, which is schematically illustrated by the line L1.

Figure 3:
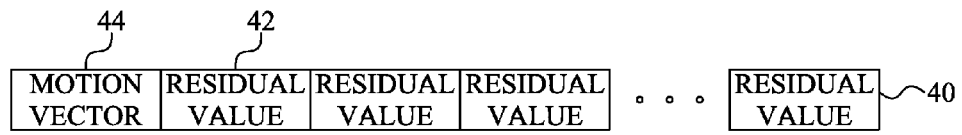
FIG. 3 is a schematic illustration of an embodiment of an encoded representation of a pixel block.

FIG. 3 is a schematic illustration of an embodiment of the encoded representation 40 generated by the encoding method of FIG. 1. The encoded representation 40 comprises the encoded representation 44 of the motion vector, which is identified as an arrow 50 in FIG. 2. In a typical embodiment, this encoded representation 40 is determined based on a difference between the motion vector 50 and a prediction motion vector. This prediction motion vector is generally the motion vector determined for one or more previous neighboring pixel blocks in the frame, which is well known in the art.

The encoded representation 44 of the motion vector may also include a frame identifier of the reference frame unless the position of the reference frame in the video sequence relative the current frame is pre-defined. The encoded representation 40 also comprises the quantized, transformed and entropy encoded residual values 42, preferably such a residual value per pixel in the pixel block.

In a particular embodiment, a so-called prediction template is determined based on the reference template and at least one interpolation filter, preferably at least one fixed interpolation filter. The interpolation filter or filters used can advantageously be the fixed 6-tap filter of H.264 [1 −20 20 −5 1]/32, in the case the filtered reference template is to have half-pel resolution or the fixed 6-tap filter above complemented with at least one bilinear filter to achieve quarter-pel resolution for the filtered reference template. The at least one adaptive filter is then determined based on the property values of the pixel in the template, the property values of the pixels in the reference template and the property values of the pixels in the prediction template.

Figure 4:
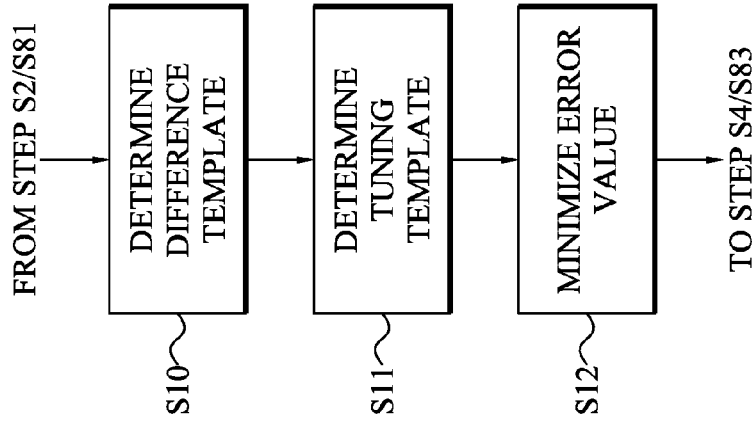
FIG. 4 is a flow diagram illustrating an embodiment of the filter determining step in the encoding method of FIG. 1 or in the decoding method of 12.

FIG. 4 is a flow diagram illustrating an embodiment of the filter determining step in the encoding method of FIG. 1. The method continues from step S2 of FIG. 1. A next step S10 determines a difference template based on the property values of the template and the property values of the pixels in the prediction template. More particularly, the difference template is obtained as $P_{ij}^T - P_{ij}^{PT}$, where $P_{ij}^T$ denotes the property value of the pixel at pixel position i,j of the template and $P_{ij}^{PT}$ indicates the property value of the pixel at pixel position i,j of the prediction template.

A tuning template is preferably determined in step S11 based on the reference template and the adaptive filter to be determined. Basically, the tuning template is determined by filtering the property values of the pixels in the reference template with the adaptive filter.

The adjustable filter parameters, such as filter coefficients of at least one of the filter taps, of the adaptive filter are then determined in step S12 by minimizing an error value representative of the difference between the difference template determined in step S10 and the tuning template determined in step S11. In a typical implementation, step S12 involves minimizing the least squares or squared error between the difference template and the tuning template:

$$E^2 = (T - IF^*T_R - AF^*T_R)^2$$

where T is the template, $T_R$ is the reference template, IF denotes an interpolation filter with $IF^*T_R$ representing the prediction template, AF is an adaptive filter and $AF^*T_R$ denotes the tuning template. In an alternative embodiment, the equation comprises a DC offset, i.e. $E^2 = (T - IF^*T_R - AF^*T_R - DC_{offset})^2$, where $DC_{offset}$ denotes the difference in average property values between the template and the reference template.

Furthermore, the difference template is defined as $T - IF^*T_R$. Taking the derivative of $E^2$ with respect to the filter parameters of the adaptive filter and setting the result to 0 gives Ax=b. A is the autocorrelation matrix and b is the cross correlation vector for a specific sub-pel position and x are the filter parameters for the adaptive filter.

The method then continues to step S4 of FIG. 1.

An alternative procedure performs a sequential filtering using the at least one adaptive filter and the at least one interpolation filter. In such a case, the property values of the reference filter are first filtered by the interpolation filter or filters to get the prediction template. The resulting prediction template is once more filtered but with the adaptive filter or filters. This means that the filter parameters of the adaptive filter are determined by minimizing the error:

$$E^2 = (T - AF^*IF^*T_R)^2 \text{ or } E^2 = (T - AF^*IF^*T_R - DC_{offset})^2$$

Figure 5:
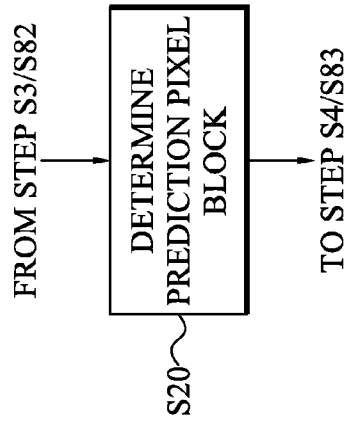
FIG. 5 is a flow diagram illustrating an additional, optional step of the encoding method of FIG. 1 or the decoding method of 12.

FIG. 5 is a flow diagram illustrating an additional, optional step of the encoding method of FIG. 1. The method continues from step S3 of FIG. 1. A next step S20 determines a prediction pixel block based on the reference pixel block and at least one interpolation filter, preferably at least one fixed interpolation filter. The at least one interpolation filter used in step S20 is preferably the same at least one interpolation filter used in step S10 for determining the prediction template as previously described.

Figure 6:
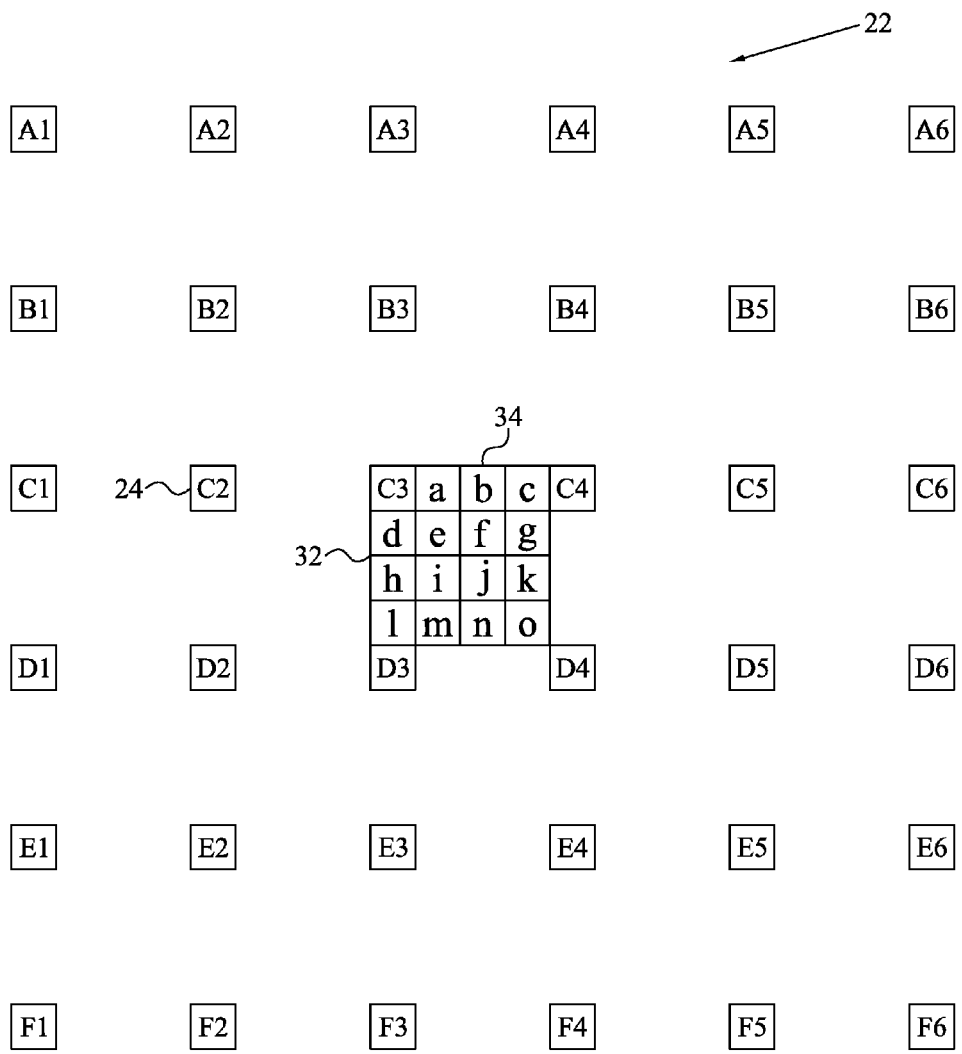
FIG. 6 is a schematic illustration of interpolation of pixel property values to get a prediction pixel block.

FIG. 6 schematically illustrates the determination of an interpolated prediction pixel block 32 using a reference block 22 in the reference frame and also some values of neighboring pixel blocks in the reference frame. The figure illustrates the concept of interpolating half-pel and quarter-pel values based on the full-pel pixel values. In the figure, full-pel values are denoted with upper-case letters, while sub-pel values are denoted with lower-case letters.

In the illustrated figure, 6-tap interpolation filters are assumed. In a first embodiment, such an interpolation filter is first applied row by row to calculate the values b1, b2, b, b4 to b6. The same interpolation filter or optionally, another interpolation filter can then applied column by column to obtain the values d1 to d2, h and d4 to d6. This interpolation filter can also be used on the column formed by b1, b2, b, b4 to b6 to calculate j. All these values are half-pel values. A bilinear filter can then be applied at already calculated half-pel positions and existing full-pel positions to get the quarter-pel values a, c, d, e, f, g, i, k, l, m, n, and o.

Alternatively, three separate or identical 6-tap horizontal filters can be used and applied to C1 to C6 for calculating the half-21 and quarter-pel 23 values a, b and c. The same horizontal filters are also preferably applied to the rows to obtain the values $a_i$, $b_i$ and $c_i$, where i=1, 2, 4, 5, 6. 12 vertical interpolation filters can then be applied on the columns A3-F3, a1-a6, b1-b6, c1-c6, three filters per column, to calculate the remaining half-25 and quarter-pel 27 values. The block formed by the pixel values C320, a-o then forms the prediction pixel block 32 having multiple sub-pel pixels 34.

Figure 7:
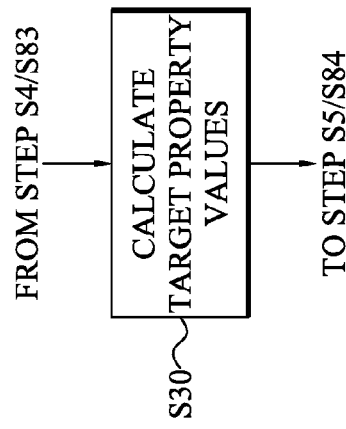
FIG. 7 is a flow diagram illustrating an additional, optional step of the encoding method of FIG. 1 or the decoding method of 12.

The method then continues to step S4 of FIG. 1, where the reference pixel block is filtered by the adaptive filter. FIG. 7 is a flow diagram illustrating an additional, optional step of determining the encoded representation of the pixel block. The method continues from step S4 of FIG. 1. A next step S30 calculates target property values based on the property values of the reference pixel block filtered by the adaptive filter and the property values of the prediction pixel block, i.e. the reference pixel block filtered by the at least one interpolation filter. The encoded representation is then determined based on the property values of the pixel block and the calculated target property values in step S5 of FIG. 1.

This means that the determination of the encoded representation is performed based on the property values of the pixel block, the filtered property values obtained by filtering the reference pixel block with the at least one determined adaptive filter and the filtered property values obtained by filtering the reference block with the at least one interpolation filter, i.e. the property values of the prediction pixel block. More preferably the residual pixel block comprising the respective residual values for the pixels is defined as:

$$RV = P - IF^*P_R - AF^*P_R \text{ or preferably } RV = P - IF^*P_R - AF^*P_R - DC_{offset}$$

where P is the pixel block, $P_R$ is the reference pixel block, IF denotes an interpolation filter with $IF^*R_R$ representing the prediction pixel block, AF is an adaptive filter and $AF^*R_R$ denotes the filtered reference pixel block. $DC_{offset}$ is the difference in average property values between the template and the reference template.

The residual pixel block can also be defined as:

$$RV = P - \frac{(IF + AF) * P_R + Int(2^B Frac(DC_{offset})) + 2^{B-1}}{2^B} - Int(DC_{offset})$$

where $Frac(DC_{offset})$ and $Int(DC_{offset})$ corresponds to the fractional respectively the integer part of $DC_{offset}$. In this case the normalization factor $$\frac{1}{2^B}$$

and the rounding factor $2^{B-1}$ have been put outside of the filtering with IF and AF where B is the accuracy in bits of the filtering in fixed point arithmetic.

In an alternative implementation, the residual pixel block is calculated as:

$$RV = P - AF * IF * P_R \text{ or preferably } RV = P - AF * IF * P_R - DC_{offset}$$

This is though a less preferred implementation as a sequential filtering operation is needed.

In a typical embodiment, the at least one adaptive filter determined in the template-based optimization procedure is preferably a one directional (1D) filter, such as a Q-tap adaptive filter, where Q is an integer equal to or larger than two. In such a case, there is choice between multiple filtering directions of the adaptive filter. For instance, assume a 2-tap adaptive filter that should be centered at a pixel with pixel position i,j. In a first implementation, four different filtering directions are available, including the horizontal and vertical filter directions. A first filtering direction could then be the vertical direction, in which pixels at positions i, j−1 and i,j are filtered. The pixels at positions i, j+1 and i,j are filtered according to a second vertical filtering direction. Finally, two horizontal filtering directions could be used, i.e. pixels i−1,j and i,j or pixels i+1, j and i,j. In another implementation diagonally filtering directions are instead or in addition available, i.e. filtering pixels i−1, j−1 and i,j, pixels i+1, j−1 and i,j, pixels i−1,j+1 and i,j, and pixels i+1, j−1 and i,j. This concept of different vertical, horizontal and/or diagonal filtering directions can of course be extended for other adaptive filters besides 2-tap adaptive filters.

Figure 8:
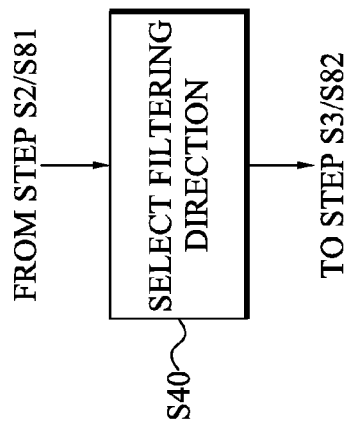
FIG. 8 is a flow diagram illustration an additional, optional step of the encoding method of FIG. 1 or the decoding method of 12.

FIG. 8 is a flow diagram illustrating an additional, optional step of the encoding method. The method continues from step S2 of FIG. 1. The next step S40 selects filtering direction for the 1D adaptive filter. In a typical embodiment, an error minimization and adaptive filter determination procedure is conducted for each available filtering direction. This results in one candidate adaptive filter per filtering direction. In such a case, step S40 selects the filtering direction, which results in the smallest error values when filtering the reference template with the adaptive filter and determining the error values based on the template, the filtered reference template and optionally the prediction template.

The adaptive filter optimized for the selected filtering direction is then determined in step S3 of FIG. 1 to be the adaptive filter to use for the current pixel block.

In order to simplify the process of determining the at least one adaptive filter by the decoder, the encoder can, once the most optimal filtering direction has been selected, generate a direction identifier associated with the selected filtering direction. This direction identifier is then preferably included in the encoded representation of the pixel block. Such a direction identifier can be kept very small thereby only marginally increasing the overall size of the encoded representation of the pixel block. For instance, if two horizontal and two vertical directions or the four diagonal filtering directions are the only available filtering directions, a 2-bit direction identifier is sufficient. If all eight directions could be used, the direction identifier is 3-bit word.

FIG. 9 is a flow diagram illustrating additional, optional steps of the encoding method. The method continues from step S2 of FIG. 1. These additional steps further increase the accuracy in the prediction of the current pixel block by providing a DC offset variability. An optional first step S50 calculates a first variance/structure representation for the property values in the template. A corresponding second variance/structure representation for the property values in the reference template is also calculated in step S50. In a typical implementation, the variance/structure representations are the respective variances of the property values in the template and the reference template, respectively. In order to reduce the complexity, the sum of absolute value between a property value and the mean property value can be used instead of the quadratic terms used in standard variance estimation.

A next optional step S51 investigates whether both the template and the reference template corresponds to the same object(s). Thus, the determined variance representations are compared with a defined variance threshold. If the absolute value of the difference in variance representations not exceed the threshold they are deemed to correspond to the same object(s) and the method continues to step S52, otherwise the method continues to step S3 of FIG. 1.

Step S52 determines a DC offset between the template and the reference template. This DC offset is calculated based on the average of the property values of the template and the average of the property values of the reference template, more preferably as a difference between the two averages. The method then continues to step S3, where the adaptive filter is determined based at least on the DC offset.

An even simpler metric than the variance representations calculated in step S50 could be to use the respective average property values in the template and the reference templates, i.e. the DC offsets. In such a case, step S51 investigates whether the DC offset of the template is very different from the DC offset of the reference template, $|DC_{offset}^T - DC_{offset}^{RT}| \leq T_{DC}$. DC offsets differing significantly from each other indicates that the DC offset is unreliable and should not be used. The method therefore continues directly from step S51 to step S3 of FIG. 1.

The common feature of these embodiments is to use a reliability measure or representation, i.e. variance or DC offset, in the determination of whether to adjust for DC offset differences in step S52 or not.

In particular at coarse quantization of the prediction error, e.g. when the residual values are coarse, such at low bit rates, there may exist blocking artifacts between areas coded individually, e.g. 4×4 or 8×8 pixel blocks. In addition, some areas may be relatively flat whereas others contain local structures, such as edges and lines. This may lead to problems when determining the at least one adaptive filters based on the template and the reference template. For instance, significant blocking artifacts in the template may negatively effect the determination of the filter parameters of the adaptive filter, thereby leading to an inferior and non-optimal adaptive filter. In the case the encoder identifies, following encoding of the pixel blocks in the template that there are any significant block artifacts, the encoder can signal this in the encoded representation of the pixel block to the decoder. Alternatively, a separate procedure that can be used independently by the encoder and decoder is performed as is illustrated by the additional, optional steps of the encoding method illustrated in FIG. 10.

The method continues from step S2 of FIG. 1. A next step S60 determines respective differences in property values of neighboring edge pixels present in neighboring pixel blocks in the template. Thus, in this embodiment the template comprises multiple adjacent pixel blocks and the property values of the pixels of a pixel block that are adjacent to a next pixel block in the template are investigated. If the difference in property values over the block boundaries is zero or is very small, the template is regarded as flat and homogenous and the risk of block artifacts is fairly small. Correspondingly, if the difference in property values is large, i.e. exceeds a value threshold, one of the neighboring pixel blocks typically comprises a structure not present in the other block. There is therefore a low risk of having any block artifacts. However, if the difference in property values is rather small but is non-zero, i.e. in the interval $[T_1, T_2]$, where $0 < T_1 < T_2$ and the values of $T_{1,2}$ can be determined in a traditional optimization procedure, there is a significant risk for the presence of block artifacts.

In such a case, a subset of the pixel blocks in the template is selected in step S60. The corresponding subset of pixel blocks in the reference template is identified in step S61. The determination of the filter parameters of the adaptive filter in step S3 of FIG. 1 is conducted based on the property values of the pixels in the selected or identified subsets of the template and reference template. Thus, in this implementation only a sub-portion of the pixels in the template and the reference template is used in the determination of the adaptive filter. By limiting the number of pixels to base the filter determination on, the impact of any block artifacts on the filter determination can be kept low, thereby possibly improving the accuracy in the filter determination even though less statistics are now used.

Figure 11:
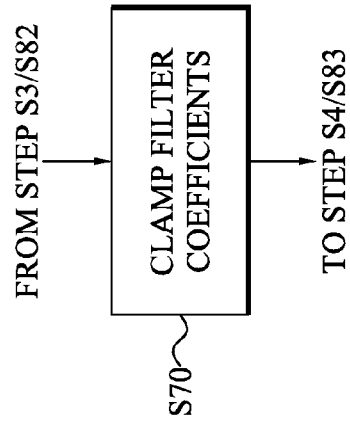
FIG. 11 is a flow diagram illustrating an additional, optional step of the encoding method of FIG. 1 or the decoding method of 12.

If small template and reference template areas are used in the adaptive filter determination, the achieved adaptive filter can be too specific for the training area and therefore not be appropriate to use in filtering the reference pixel block. Using a small number of free filter parameters reduces the problem, but depending on the training area, problems may still appear. In order to reduce such problems different restrictions to the filter parameters can be imposed. For instance, the magnitude of the filter coefficients of the adaptive filter can be limited. FIG. 11 illustrates such a procedure. The method continues from step S3 of FIG. 1, where the at least one adaptive filter has been determined. A next step S70 clamps the filter coefficients into an interval of allowable coefficient value if any of the coefficients extend beyond the interval. For instance, assume that the allowable coefficient interval is $[CF_{min}, CF_{max}]$. If any filter coefficient of the adaptive filter is smaller than $CF_{min}$ or is larger than $CF_{max}$, it is replaced by the minimum value $CF_{min}$ or the maximum value $CF_{max}$. The method then continues to step S4, where the now modified adaptive filter is used for filtering the reference pixel block.

Alternatively, or in addition, one or more of the filtering directions available for 1D adaptive filters may be forbidden if the "optimal" candidate adaptive filter determined for that or those filtering directions has any filter coefficients with magnitudes exceeding a threshold value.

Adaptive Filter Examples

In these non-limiting examples different adaptive filters that can be used in the present embodiments are illustrated. The adaptive filters of the examples are presented as being 2-tap or 4-tap directional filters, though the embodiments are not limited thereto.

A first example involves determining both filter coefficients $f_1$, $f_2$ of the adaptive filter $[f_1\ f_2]$.

In another example the determination of the adaptive filter involves optimizing a filter gain filter gain g applicable to a fixed 2-tap filter $[\alpha\ \beta]$ to get said adaptive filter $[g\alpha\ g\beta]$, where $\alpha, \beta$ are non-zero numbers.

A further example determines the adaptive filter based on two fixed 2-tap filters $[\alpha_1\ \beta_1]$ and $[\alpha_2\ \beta_2]$ and two filter gains $g_1$ and $g_2$. The resulting adaptive filter is therefore defined as $[g_1\alpha_1 + g_2\alpha_2\ g_1\beta_1 + g_2\beta_2]$, where $\alpha_1, \alpha_2, \beta_1, \beta_2$ are zero or non-zero numbers with the proviso that not both of $\alpha_1, \alpha_2$ are zero and not both of $\beta_1, \beta_2$ are zero. For instance, the fixed filters could be $[1\ -1]$ and $[0\ 1]$.

Still another example determines the adaptive filter based on one fixed 4-tap filter $[\alpha_1\ \alpha_2\ \alpha_3\ \alpha_4]$ one filter gain $g_1$. The resulting adaptive filter is therefore defined as $g_1[\alpha_1\ \alpha_2\ \alpha_3\ \alpha_4]$, where $\alpha_1, \alpha_2, \alpha_3, \alpha_4$, are zero or non-zero numbers. For instance, the fixed filter could be $[1\ -1\ -1\ 1]$.

In the traditional approach of encoding a pixel block according to inter prediction, including bi-directional direction, of H.264, the reference pixel block is identified in a motion estimation as described herein. A prediction pixel block is then calculated by filtering the reference pixel block with at least one fixed interpolation filter as is also disclosed herein. The residual values are calculated by taking pixelwise differences between the current pixel block and the prediction pixel block.

The embodiments disclosed herein can therefore be seen as adjusting or improving the initial prediction, i.e. the prediction pixel block, by using at least one adaptive filter independently determined at both the encoder side and the decoder side. This improves the prediction significantly and also improves the error resilience compared to the standard H.264 prediction because the final prediction of the current pixel block is a combination both of a prediction, i.e. the prediction pixel block, based on encoded parameters, i.e. the displacement vector, and a local tuning prediction, i.e. the reference pixel block filtered by the at least one adaptive filter.

In practical implementations the fine adjustment achieved by the present invention may be applied to a whole macroblock of a frame. Alternatively, the fine adjustment achieved by the adaptive filtering could be applied to only sub-portions of the macroblock, such as the upper or lower 8×16 pixels, the left or right 16×8 pixels, or one or more of the four 8×8 blocks in the 16×16 macroblock.

In such a case, the encoder preferably computes rate distortion cost of the macroblock including side information describing which parts of the macroblock that is referred and compares this cost to the cost of coding other macroblock coding types. A binary tree code can then be used for signaling which inter 16×16 mode to use for a macroblock. For instance, a code of $0_{bin}$ signals the standard inter 16×16 mode, $10_{bin}$ indicates that the whole 16×16 macroblock should be adjusted by the adaptive filtering, $110_{bin}$ indicates that the adaptive filtering should be only applied for the upper half of the macroblock and $111_{bin}$ indicates that the lower half of the macroblock should use the improvement achieved by the adaptive filtering.

Pixel Block Decoding

Figure 12:
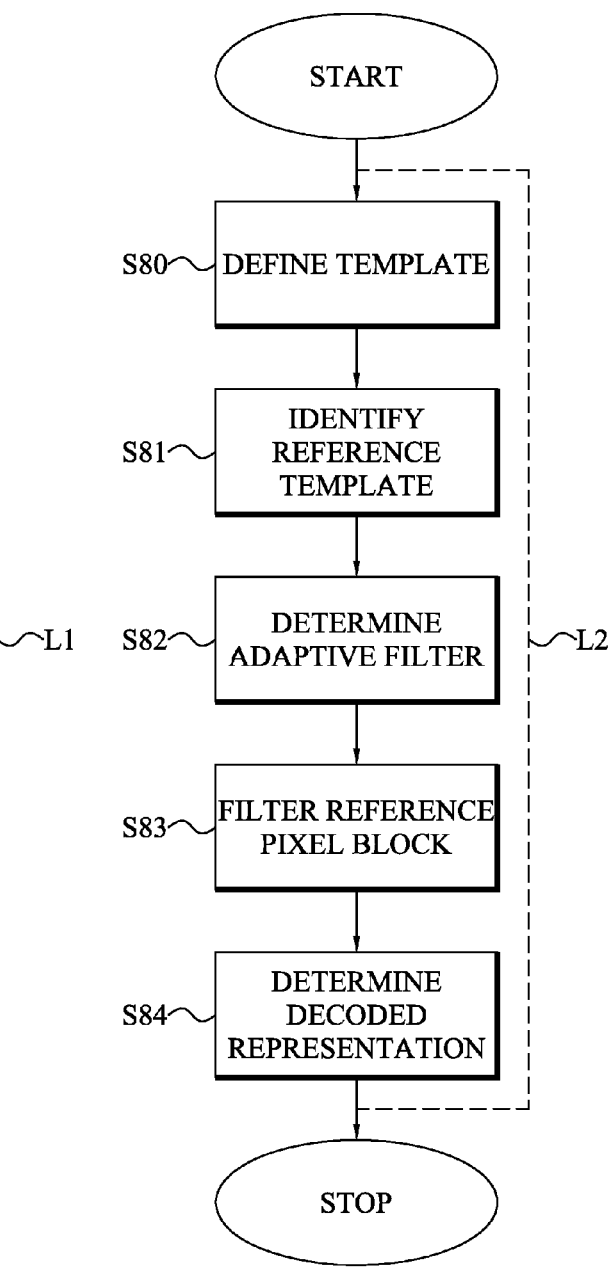
FIG. 12 is a flow diagram illustrating a method of decoding an encoded representation of a pixel block according to an embodiment.

FIG. 12 is a flow diagram illustrating a method of decoding an encoded representation of a pixel block in a frame of an encoded image or video sequence. The method starts in step S80, where a template comprising multiple pixels and being positioned adjacent the pixel block to decode in the frame is identified. This step S80 basically corresponds to the template defining step S1 of FIG. 1 and is not further described.

Thereafter a reference template is to be identified in a reference frame of the encoded image or video sequence in step S81. This step S81 preferably first involves identifying the reference pixel block in the reference frame based on information, i.e. the optional frame identifier and the motion or displacement vector, included in the encoded representation. Once the correct reference pixel block has been found in the reference frame, the reference template is identified as comprising the multiple pixels positioned adjacent the reference pixel block as previously described in connection with step S2 of FIG. 1.

At least one adaptive filter is determined for the current pixel block based on property values of the defined template and the identified reference template. This determination is basically conducted by the decoder in the same way as step S3 of FIG. 1 was conducted by the encoder.

Filtered property values are then determined in step S83 based on the property values of the reference pixel block in the reference frame and the at least one adaptive filter determined in step S82. The filtered property values are typically obtained by filtering the reference pixel block with the at least one adaptive filter. This step S83 is basically determined as previously described in connection with step S4 of FIG. 1.

A decoded representation of the pixel block is determined in step S84 based on the filtered property values from step S83 and residual values retrieved from the encoded representation of the pixel block. Briefly, the encoded, quantized and transformed residual values are retrieved from the encoded representation. They are decoded, preferably entropy decoded using any of the previously mentioned entropy encoding/decoding algorithms. The decoded residual errors are inverse transformed and dequantized to get the residual values. The retrieved and processed residual values are added, pixel by pixel, to the corresponding filtered property values. The decoded representation is determined based on these sums.

The method ends or returns to step S80 for the purpose of decoding a next pixel block in the frame.

FIG. 4 illustrates a preferred implementation of determining the adaptive filter. As previously described above in connection with the encoding, step S10 determines a difference template between the template and the prediction template obtained by filtering the reference template with at least one, typically fixed, interpolation filter. A tuning template is determined in step S11 by filtering the reference template with the determined at least one adaptive filter to be determined and the adjustable filter parameters of the adaptive filter are determined by minimizing the squared difference between the difference template and the tuning template. The method then continues to step S83 of FIG. 12.

Alternatively, the adaptive filter is determined by minimizing the squared difference between the template and the reference template first filtered with the at least one interpolation filter and then subsequently filtering the filtered result, i.e. prediction template, with the adaptive filter to determine.

FIG. 5 illustrates an additional, optional step of the decoding method. The method continues from step S82 of FIG. 1. The next step S20 determines the prediction pixel block based on the at least one interpolation filter and the reference pixel block as previously described. The method then continues to step S83 of FIG. 1. In this embodiment, the decoded representation of the filter block is determined based on the reference pixel block filtered by the adaptive filter the reference pixel block filtered by the at least one interpolation filter, i.e. the prediction pixel block, and the residual values:

$$P=RV+IF^*P_R+AF^*P_R \text{ or } P=RV+IF^*P_R+AF^*P_R+DC_{offset}$$

or, less preferred but still possible, $$P=RV+AF^*IF^*P_R \text{ or } P=RV+AF^*IF^*P_R+DC_{offset}$$

The upper equations basically teache, as is illustrated in FIG. 7, the calculation of target property values based on the property values of the reference block filtered by the at least one interpolation filter, i.e. the prediction pixel block, and the property values of the reference block filtered by the adaptive filter in step S30. These target property values are then added to the residual values to get the decoded representation of the pixel block.

As was previously described in connection with FIG. 8, the adaptive filter can be a one directional adaptive filter. The decoder can then select the particular filtering direction to use in step S30 based on a direction identifier determined by the encoder and included in the encoded representation of the pixel block. Alternatively, the decoder itself performs the selection procedure in step S40 as previously described above in connection with the pixel block encoding.

DC offset adjustment may also be used in the decoding as previously described in connection with the encoding and FIG. 9. In such a case, variance/structure representations are calculated for the template and the reference template in step S50 as previously described. If both the template and the reference template are deemed to have similar variance/structure representation, which is tested in step S51, a DC offset is calculated as a difference between the average of the property values in the template and the average of the property values in the reference template. In such a case, the DC offset is used for determining the at least one adaptive filter as previously disclosed herein.

The discussion above in connection with FIGS. 10 and 11 regarding selecting subset of the template and reference template when determining the adaptive filter and clamping determined filter parameters can also be used during pixel block decoding.

Encoder

FIG. 13 is a schematic block diagram of an embodiment of a device or encoder 100 for encoding a pixel block in a frame of an image or a video sequence. The device 100 comprises a template identifier 110 arranged for identifying a reference template having multiple pixels and being positioned adjacent a reference pixel block in a reference frame. The template identifier 110 preferably first identifies the reference pixel block in a motion estimation procedure as previously described and then identifies the reference template as constituting a pre-defined number of pixels positioned close to the identified reference pixel block.

A filter determiner 120 is arranged for determining filter parameters of at least one adaptive filter based on the property values in the reference template and property values in a template positioned adjacent the pixel block to be encoded.

Once the at least one adaptive filter has been determined as previously described herein, a filter unit 130 determines filtered property values based on the reference pixel block and the determined at least one adaptive filter.

An encoded representation of the pixel block is determined by a representation determiner 140 based on the property values of the pixel block and the filtered property values from the filter unit 130. Generally, the representation determiner 140 calculates residual values based on the property value differences and then quantize, transform and entropy encode the residual values. The encoded representation comprises these encoded residual values and preferably an encoded representation of the motion or displacement vector used for identifying the reference pixel block.

The units 110 to 140 of the device 100 may be provided as hardware, software or a combination of hardware and software. The device 100 may be implemented in a media processing device, such as a media engine, media server or media provider, for instance in a wired or wireless communication system.

Figure 14:
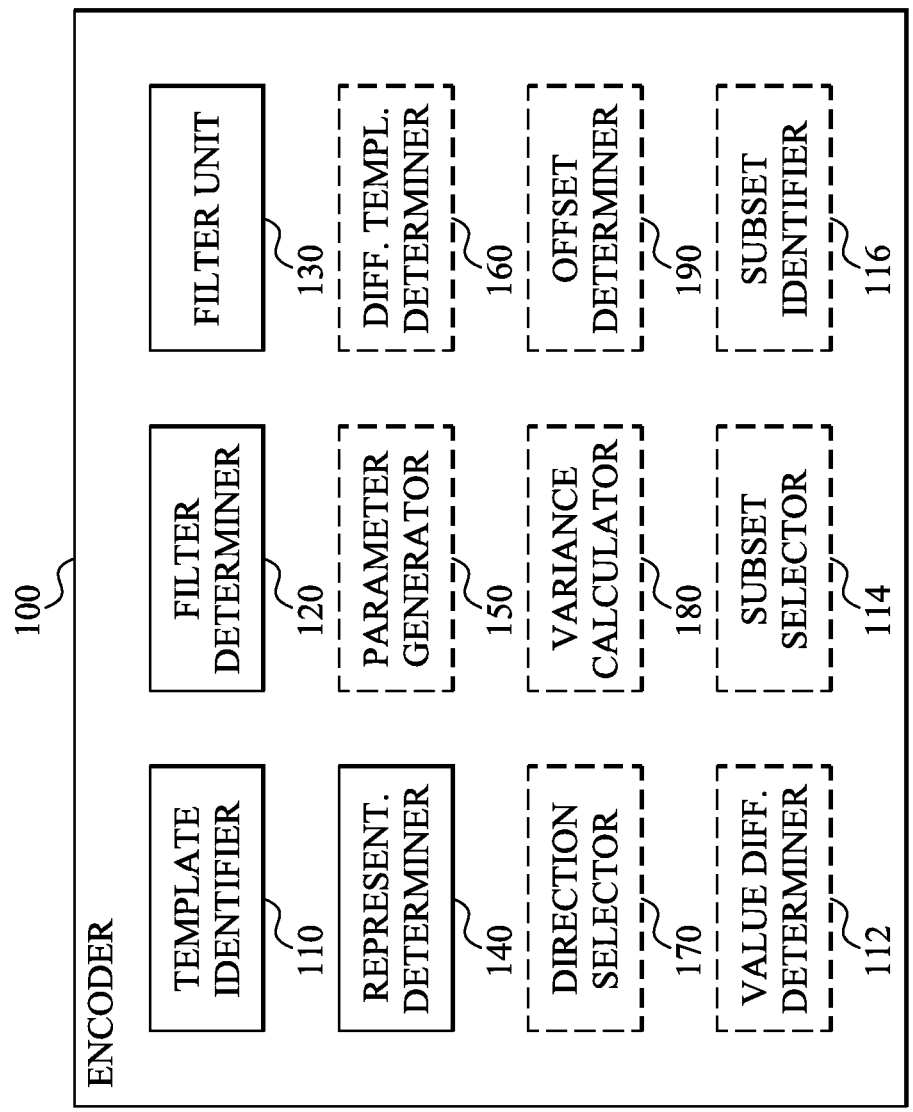
FIG. 14 is a schematic block diagram of an encoder according to another embodiment.

FIG. 14 is a schematic block diagram illustrating another embodiment of the pixel block encoding device 100. In addition to the units included in the embodiment illustrated in FIG. 13, this device 100 comprises a parameter generator 150 for generating a parameter representation representative of the displacement vector provided during the motion estimation and identifying the reference pixel block in the reference frame. The encoded representation of the pixel block comprises this parameter representation and optionally a frame identifier associated with the reference frame.

The filter unit 130 is preferably implemented for determining a prediction template based on the reference template and at least one interpolation filter. In such a case, the prediction template may have sub-pel resolution as achieved by filtering the property values of the reference template with the at least one interpolation filter. The filter unit 130 preferably also determines a tuning template based on the reference filter and the at least one adaptive filter to be determined by the filter determiner 120.

A difference template determiner 160 of the device 100 determines a difference template based on the template and the prediction template. The filter determiner 120 typically determines the adaptive filter by minimizing the least squares error between the difference template and the tuning template.

In a particular embodiment, the filter unit 130 is arranged for determining a prediction pixel block based on the reference pixel block and at least one interpolation filter, preferably the same at least one interpolation filter that was used by the filter unit 130 for determining the prediction template. In such a case, the representation determiner 140 preferably determines the encoded representation of the pixel block based on the property values of the pixel block, the filtered property values obtained by filtering the reference pixel block with the adaptive filter and the property values of the prediction pixel block.

The device 100 also preferably comprises a variance/structure calculator 180 for calculating a respective variance/structure measure of the property values in the template and the reference template. The absolute difference between these two variance measures is compared by the variance calculator 180 with a variance threshold. If the absolute difference does not exceed the variance threshold, an offset determiner 190 determines a DC offset as the difference in the average of the property values of the template and the average of the property values of the reference template. The filter determiner 120 then preferably uses this DC offset in the determination of the adaptive filter in addition to the property values of the template, the reference template and optionally the determined prediction template.

A direction selector 170 may be implemented in the device 100 for selecting an optimal filtering direction using the adaptive filter, which in this embodiment is a one directional adaptive filter. In a preferred implementation, an exhaustive search among the available filtering directions is conducted so that the filter determiner 120 determines the respective optimal adaptive filters for each of the filtering directions. The filtering direction and the adaptive filter leading to the smallest residual values are then selected and used for the current pixel block.

Portions of the template and reference template may be used in the determination of the adaptive filter as previously discussed. In such a case, the device 100 comprises a value difference determiner 112 for determining respective differences in property values of neighboring edge pixels in the border between adjacent pixel blocks in the template. If the respective differences in property values from the value difference determiner 112 are within a pre-defined property value interval corresponding to a high risk of block artifacts, a subset selector 114 selects a subset of the multiple pixel blocks in the template. A subset identifier 116 identifies the corresponding subset of multiple pixel blocks in the reference template. The filter determiner 120 determines the adaptive filter based on the property values of the two template subsets thereby excluding other property values in the template and the reference template from the adaptive filter determination process.

The units 110 to 190 of the device 100 may be provided as hardware, software or a combination of hardware and software. The device 100 may be implemented in a media processing device, such as a media engine, media server or media provider, for instance in a wired or wireless communication system.

Decoder

Figure 15:
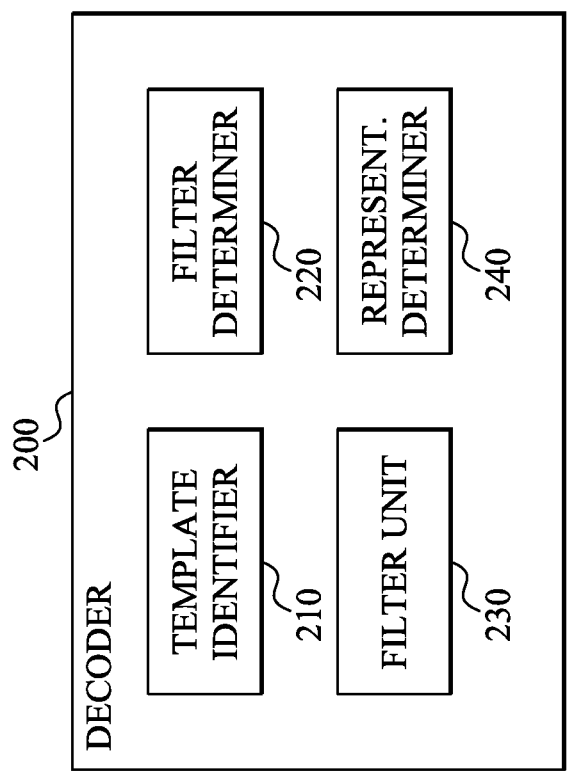
FIG. 15 is a schematic block diagram of a decoder according to an embodiment.

FIG. 15 is a schematic block diagram of an embodiment of a device or decoder 200 for decoding an encoded representation of a pixel block in a frame of an encoded image or video sequence.

The device 200 comprises a template identifier 210 arranged for identifying a reference template in a reference frame of the encoded image or video sequence. In a typical embodiment, the template identifier 210 first identifies a reference pixel block in the reference frame based on a parameter representation, such as displacement vector and optionally frame identifier, assigned to the current pixel block and included in the encoded representation. Once the reference pixel block has been located, the reference template can be identified as constituting a pre-defined number of pixel positions adjacent to the reference pixel block.

A filter determiner 220 is implemented in the device 200 for determining at least one filter parameter of an adaptive filter based on property values of the reference template and corresponding property values in a template positioned at pre-defined pixel positions adjacent the current pixel block in the frame. The determination of the adaptive filter is preferably conducted by minimizing an error metric involving a difference in the template property values and the reference template property values filtered by the adaptive filter as previously described.

Once the at least one adaptive filter has been determined by the filter determiner 220, a filter unit 230 filters property values of the reference pixel block using the at least one adaptive filter. These filtered property values are used together with residual property values determined from the encoded representation, such as by entropy decoding, inverse transforming and dequantizing the encoded information included in the encoded representation, to get a decoded representation of the pixel block by a representation determiner 240.

The units 210 to 240 of the device 200 may be provided as hardware, software or a combination of hardware and software. The device 200 may be implemented in a media processing device, such as a user client or terminal including or being connected to a media player for rendering the decoded data.

Figure 16:
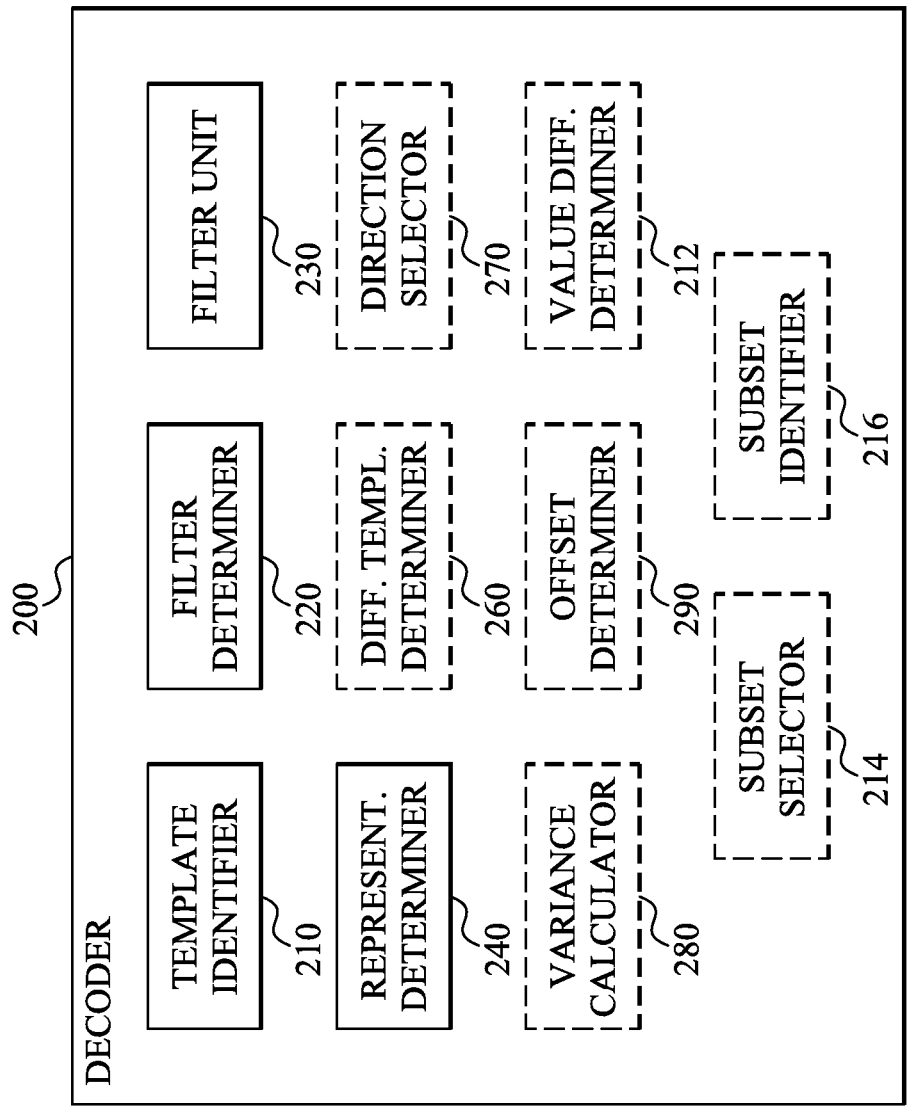
FIG. 16 is a schematic block diagram of a decoder according to another embodiment.

FIG. 16 is a schematic block diagram illustrating another embodiment of the pixel block decoding device 200. The filter unit 230 of this embodiment preferably determines a prediction template based on the reference template identified by the template identifier 210 and at least one, typically fixed, interpolation filter. The filter unit 230 preferably also determines a tuning template based on the reference template and the adaptive filter to be determined. In such a case, a difference template determiner 260 is implemented in the device 200 for determining a difference template based on the template and the prediction template. The filter determiner 220 determines the adaptive filter by minimizing the squared error between this difference template and the tuning template as previously disclosed herein.

If the above described embodiment is used by the device 200 for determining the adaptive filter, the filter unit 230 preferably determines a prediction pixel block based on the reference block and the at least one interpolation filter used for generating the prediction template. The representation determiner 240 uses the prediction pixel block together with the reference pixel block filtered by the adaptive filter from the filter determiner 220 and the residual values for generating the decoded representation of the pixel block.

An optional variance/structure calculator 280 may be provided in the device 200 for calculating respective variance/structure representations of property values in the template and the reference template. If the absolute value of the difference of these variance representations does not exceed a defined variance threshold as determined by the variance calculator 280, an offset determiner 290 preferably determines a DC offset as the difference between the average property value in the template and the average property value in the reference template. The calculated DC offset is used by the filter determiner 220, in addition to the property values of the template, the reference template and optionally the prediction template, to generate the adaptive filter. The DC offset is preferably also used by the presentation determiner 240 when calculating the decoded representations of the pixels in the pixel block.

If the adaptive filter is a one directional adaptive filter and there are multiple available filtering directions, the device 200 can contain a direction selector 270 for selecting a filtering direction for the adaptive, one direction filter. The direction selector 270 can base the selection based on feedback from the encoder, included in the encoded representation of the pixel block in the form of a direction identifier. Alternatively, the device 200 performs a separate optimization of filtering direction as previously described. The direction selector 270 then selects the filtering direction that minimizes the error metric determined based on the template and the reference template filtered by the adaptive filter.

In similarity to the encoder of FIG. 14, the device 200 may comprise a value difference determiner 212, a subset selector 214 and a subset identifier 216 for investigating whether only portions of the template and the reference template should be used when determining the adaptive filter in order to reduce the problems that otherwise could occur due to the presence of blocking artifacts.

The operation of these units 212, 214, 216 is similar to what was described in connection with FIG. 14 and is not repeated herein.

The units 210 to 290 of the device 200 may be provided as hardware, software or a combination of hardware and software. The device 200 may be implemented in a media processing device, such as a user client or terminal including or being connected to a media player for rendering the decoded data.

It will be understood by a person skilled in the art that various modifications and changes may be made to the present invention without departure from the scope thereof, which is defined by the appended claims.

The invention claimed is:

1. A method of encoding a pixel block in a frame of an image or a video sequence, said method comprising:
    estimating, based on said property values of said pixel block, a displacement vector identifying a reference pixel block in a reference frame of said image or said video sequence;
    defining a template comprising multiple pixels and being positioned adjacent said pixel block in said frame;
    identifying a reference template comprising multiple pixels and being positioned adjacent said reference pixel block in said reference frame;
    determining a prediction template based on said reference template and at least one interpolation filter;
    determining a difference template based on property values of said multiple pixels of said template and property values of multiple pixels of said prediction template;
    determining a tuning template by filtering said property values of said multiple pixels of said reference template with an adaptive filter;
    determining at least one filter parameter of said adaptive filter by reducing a least squares error between said difference template and said tuning template;
    determining filtered property values based on property values of said reference pixel block and said adaptive filter;
    determining an encoded representation of said pixel block based on property values of said pixel block and said filtered property values, wherein said encoded representation comprises an encoded representation of said displacement vector;
    calculating a first variance representation for said property values of said multiple pixels in said template;
    calculating a second variance representation for said property values of said multiple pixels in said reference template; and
    determining, if an absolute difference between said first variance representation and said second variance representation does not a exceed a variance threshold, a DC offset based on an average of said property values of said multiple pixels in said template and an average of said property values of said multiple pixels in said reference template,
    wherein said determining said at least one filter parameter comprises determining said at least one filter parameter of said adaptive filter based on said property values of said multiple pixels in said template, said property values of said multiple pixels in said reference template and said DC offset, and
    wherein said determining said encoded representation comprises determining said encoded representation based on said property values of said pixel block, said filtered property values and said DC offset.

2. The method according to claim 1, further comprising determining a prediction pixel block based on said reference pixel block and said at least one interpolation filter, wherein said determining said encoded representation comprises determining said encoded representation based on said property values of said pixel block, said filtered property values and property values of multiple pixels of said prediction pixel block.

3. A method of decoding an encoded representation of a pixel block in a frame of an encoded image or a video sequence, said method comprising:
- defining a template comprising multiple pixels and being positioned adjacent said pixel block in said frame;
- identifying a reference pixel block in a reference frame of said encoded image or said video sequence based on an encoded representation of a displacement vector associated with said pixel block and comprised in said encoded representation;
- defining a reference template comprising multiple pixels and being positioned adjacent said reference pixel block in said reference frame;
- determining a prediction template based on said reference template and at least one interpolation filter;
- determining a difference template based on property values of said multiple pixels of said template and property values of said multiple pixels of said prediction template;
- determining a tuning template by filtering said property values of said multiple pixels of said reference template with an adaptive filter;
- determining at least one filter parameter of said adaptive filter by reducing a least squares error between said difference template and said tuning template;
- determining filtered property values based on property values of said reference pixel block and said adaptive filter;
- determining a decoded representation of said pixel block based on said filtered property values and residual property values comprised in said encoded representation;
- calculating a first variance representation for said property values of said multiple pixels in said template;
- calculating a second variance representation for said property values of said multiple pixels in said reference template; and
- determining, if an absolute difference between said first variance representation and said second variance representation does not a exceed a variance threshold, a DC offset based on an average of said property values of said multiple pixels in said template and an average of said property values of said multiple pixels in said reference template,
- wherein said determining said at least one filter parameter comprises determining said at least one filter parameter of said adaptive filter based on said property values of said multiple pixels in said template, said property values of said multiple pixels in said reference template and said DC offset, and
- wherein said determining said decoded representation comprises determining said decoded representation based on said filtered property values, said residual property values and said DC offset.

4. The method according to claim 3, further comprising determining a prediction pixel block based on said reference pixel block and said at least one interpolation filter, wherein said step of determining said decoded representation comprises determining said decoded representation of said pixel block based on said filtered property values, said residual property values and property values of multiple pixels of said prediction pixel block.

5. The method according to claim 1, wherein said adaptive filter is an adaptive, one directional filter and said method further comprising selecting a filtering direction for said adaptive, one directional filter among multiple available filtering directions, wherein said step of determining said filtered property values comprises filtering said property values of said reference pixel block with said adaptive, one directional filter in said selected filtering direction.

6. The method according to claim 1, wherein said template comprises multiple template pixel blocks and said reference template comprises multiple reference template pixels block, said method further comprising:
- determining respective differences in property values of neighboring edge pixels present in neighboring template pixel blocks of said template;
- selecting a subset of said multiple template pixel blocks if said respective differences in property values are within a defined property value interval; and
- identifying a corresponding subset of said multiple reference template pixel blocks in said reference template, wherein said determining said at least one filter parameter comprises determining said at least one filter parameter of said adaptive filter based on property values of said selected subset of said multiple template pixel blocks and property values of said identified corresponding subset of said multiple reference template pixel blocks.

7. A device for encoding a pixel block in a frame of an image or a video sequence, said device comprising:
- a parameter generator configured to generate an encoded representation of a displacement vector identifying a reference pixel block in a reference frame of said image or said video sequence;
- a reference template identifier configured to identify a reference template comprising multiple pixels and being positioned adjacent said reference pixel block in said reference frame;
- a filter unit configured to determine a prediction template based on said reference template and at least one interpolation filter;
- a difference template determiner configured to determine a difference template based on property values of said multiple pixels of said reference template and property values of multiple pixels of said prediction template;
- said filter unit being further configured to determine a tuning template by filtering said property values of said multiple pixels of said reference template with an adaptive filter;
- a filter determiner configured to determine at least one filter parameter of said adaptive filter by reducing a least squares error between said difference template and said tuning template;
- said filter unit being further configured to determine filtered property values based on property values of said reference pixel block and said adaptive filter;
- a representation determiner configured to determine an encoded representation of said pixel block based on property values of said pixel block and said filtered property values, wherein said encoded representation comprises said encoded representation of said displacement vector;
- a template identifier configured to identify a template comprising multiple pixels and being positioned adjacent said pixel block in said frame;
- a variance calculator configured to i) calculate a first variance representation for said property values of said multiple pixels in said template and ii) calculate a second variance representation for said property values of said multiple pixels in said reference template; and
- an offset determiner configured to determine, if an absolute difference between said first variance representation and said second variance representation does not a exceed a variance threshold, a DC offset based on an average of said property values of said multiple pixels in said template and an average of said property values of said multiple pixels in said reference template, wherein said filter determiner is configured to determine said at least one filter parameter of said adaptive filter based said property values of said multiple pixels in said reference template, said property values of multiple pixels in said template and said DC offset, and wherein said representation determiner is configured to determine said encoded representation based on said property values of said pixel block, said filtered property values and said DC offset.

8. The device according to claim 7, wherein said filter unit is further configured to determine a prediction pixel block based on said reference pixel block and said at least one interpolation filter, wherein said representation determiner is configured to determine said encoded representation based on said property values of said pixel block, said filtered property values and property values of multiple pixels of said prediction pixel block.

9. A device for decoding an encoded representation of a pixel block in a frame of an encoded image or a video sequence, said device comprising:

a template identifier configured to i) identify a reference pixel block in a reference frame of said encoded image or said video sequence based on an encoded representation of a displacement vector associated with said pixel block and comprised in said encoded representation and ii) define a reference template comprising multiple pixels and being positioned adjacent said reference pixel block in said reference frame;

a filter unit configured to determine a prediction template based on said reference template and at least one interpolation filter;

a difference template determiner configured to determine a difference template based on property values of said multiple pixels of said template and property values of said multiple pixels of said prediction template;

said filter unit being further configured to determine a tuning template by filtering property values of said multiple pixels of said reference template with an adaptive filter;

a filter determiner configured to determine at least one filter parameter of said adaptive filter by reducing a least squares error between said difference template and said tuning template;

said filter unit being further configured to determine filtered property values based on property values of said reference pixel block and said adaptive filter;

a representation determiner configured to determine a decoded representation of said pixel block based on said filtered property values and residual property values comprised in said encoded representation;

a variance calculator configured to i) calculate a first variance representation for said property values of said multiple pixels in said template and ii) calculate a second variance representation for said property values of said multiple pixels in said reference template; and an offset determiner configured to determine, if an absolute difference between said first variance representation and said second variance representation does not a exceed a variance threshold, a DC offset based on an average of said property values of said multiple pixels in said template and an average of said property values of said multiple pixels in said reference template, wherein said filter determiner is configured to determine said at least one filter parameter of said adaptive filter based on said property values of said multiple pixels in said reference template, said property values of multiple pixels in said template and said DC offset, and said representation determiner is further configured to determine said decoded representation based on said filtered property values, said residual property values and said DC offset.

10. The device according to claim 9, wherein said filter unit is further configured to determine a prediction pixel block based on said reference block and at least one interpolation filter, wherein said representation determiner is configured to determine said decoded representation based on said filtered property values, said residual property values and property values of multiple pixels of said prediction pixel block.

11. The device according to claim 7, wherein said adaptive filter is an adaptive, one directional filter and said device further comprises a direction selector for selecting a filtering direction for said adaptive, one directional filter among multiple available filtering directions, wherein said filter unit is arranged for filtering said property values of said reference pixel block with said adaptive, one directional filter in said filtering direction selected by said direction selector.

12. The device according to claim 7, wherein said template comprises multiple template pixel blocks and said reference template comprises multiple reference template pixels block, said device further comprising:

a value difference determiner configured to determine respective differences in property values of neighboring edge pixels present in neighboring template pixel blocks of said template;

a subset selector configured to select a subset of said multiple template pixel blocks if said respective differences in property values are within a defined property value interval; and a subset identifier configured to identify a corresponding subset of said multiple reference template pixel blocks in said reference template, wherein said filter determiner is configured to determine said at least one filter parameter of said adaptive filter based on property values of said selected subset of said multiple template pixel blocks and property values of said identified corresponding subset of said multiple reference template pixel blocks.

13. The method according to claim 3, wherein said adaptive filter is an adaptive, one directional filter and said method further comprising selecting a filtering direction for said adaptive, one directional filter among multiple available filtering directions, wherein said step of determining said filtered property values comprises filtering said property values of said reference pixel block with said adaptive, one directional filter in said selected filtering direction.

14. The method according to claim 3, wherein said template comprises multiple template pixel blocks and said reference template comprises multiple reference template pixels block, said method further comprising:

determining respective differences in property values of neighboring edge pixels present in neighboring template pixel blocks of said template;

selecting a subset of said multiple template pixel blocks if said respective differences in property values are within a defined property value interval; and identifying a corresponding subset of said multiple reference template pixel blocks in said reference template, wherein said determining said at least one filter parameter comprises determining said at least one filter parameter of said adaptive filter based on property values of said selected subset of said multiple template pixel blocks and property values of said identified corresponding subset of said multiple reference template pixel blocks.

15. The device according to claim 9, wherein said adaptive filter is an adaptive, one directional filter and said device further comprises a direction selector for selecting a filtering direction for said adaptive, one directional filter among multiple available filtering directions, wherein said filter unit is arranged for filtering said property values of said reference pixel block with said adaptive, one directional filter in said filtering direction selected by said direction selector.

16. The device according to claim 9, wherein said template comprises multiple template pixel blocks and said reference template comprises multiple reference template pixels block, said device further comprising:
   a value difference determiner configured to determine respective differences in property values of neighboring edge pixels present in neighboring template pixel blocks of said template;
   a subset selector configured to select a subset of said multiple template pixel blocks if said respective differences in property values are within a defined property value interval; and
   a subset identifier configured to identify a corresponding subset of said multiple reference template pixel blocks in said reference template, wherein said filter determiner is configured to determine said at least one filter parameter of said adaptive filter based on property values of said selected subset of said multiple template pixel blocks and property values of said identified corresponding subset of said multiple reference template pixel blocks.

* * * * *

UNITED STATES PATENT AND TRADEMARK OFFICE
CERTIFICATE OF CORRECTION

| | | |
|---|---|---|
| PATENT NO. | : 8,451,902 B2 | Page 1 of 1 |
| APPLICATION NO. | : 12/935757 | |
| DATED | : May 28, 2013 | |
| INVENTOR(S) | : Andersson et al. | |

It is certified that error appears in the above-identified patent and that said Letters Patent is hereby corrected as shown below:

On the Title Page, Item (75), under "Inventors", in Column 1, Line 2, delete "Väsby (SE);" and insert -- Upplands Väsby (SE); --, therefor.

In the Specification

In Column 7, Lines 10-11, delete "[1 -20 20 -5 1]/32 ," and insert -- [1 -5 20 20-5 1]/32, --, therefor.

In Column 8, Line 21, delete "b, b4" and insert -- b3, b4 --, therefor.

In Column 8, Line 24, delete "d2, h" and insert -- d2, d3 --, therefor.

In Column 8, Line 25, delete "b2, b," and insert -- b2, b3, --, therefor.

In Column 8, Line 35, delete "5, 6. 12" and insert -- 5, 6, 12 --, therefor.

In Column 8, Line 39, delete "C320," and insert -- C3, --, therefor.

In Column 17, Line 40, delete "presentation" and insert -- representation --, therefor.

Signed and Sealed this
Second Day of September, 2014

Michelle K. Lee
*Deputy Director of the United States Patent and Trademark Office*